United States Patent [19]

Osada

[11] Patent Number: 4,793,785

[45] Date of Patent: Dec. 27, 1988

[54] APPARATUS OF MULTIPLUNGER TYPE FOR ENCLOSING SEMICONDUCTOR ELEMENTS WITH RESIN

[76] Inventor: Michio Osada, No. 6-197, 3-chome, Myojyo-cho, Uji-shi, Kyoto, Japan

[21] Appl. No.: 34,946

[22] Filed: Apr. 6, 1987

[30] Foreign Application Priority Data

Apr. 11, 1986 [JP] Japan ............................. 61-55057[U]
May 17, 1986 [JP] Japan ............................. 61-113353

[51] Int. Cl.⁴ .............................................. B29C 45/02
[52] U.S. Cl. .................................... 425/116; 425/190; 425/195; 425/542
[58] Field of Search ............... 425/544, 588, 116, 117, 425/190, 129 R, 195, 129.1

[56] References Cited

U.S. PATENT DOCUMENTS

| | | | |
|---|---|---|---|
| 4,347,211 | 8/1982 | Bandoh | 425/544 |
| 4,388,265 | 6/1983 | Bandoh | 425/588 |
| 4,416,604 | 11/1983 | Bender et al. | 425/190 |
| 4,511,317 | 4/1985 | Bandoh | 425/544 |
| 4,555,086 | 11/1985 | Kiyotomo | 425/116 |
| 4,599,062 | 7/1986 | Konishi | 425/116 |
| 4,714,421 | 12/1987 | D'Agostino | 425/195 |

FOREIGN PATENT DOCUMENTS 0125616 7/1985 Japan ............................. 425/129 R Primary Examiner—Willard Hoag
Attorney, Agent, or Firm—Larson & Taylor

[57] ABSTRACT

An apparatus of the multiplunger type having a stationary die and a movable die opposed thereto includes stationary and movable cavity blocks and ejector plates removably mounted on stationary and movable die bases, respectively. The lower one of the die bases is removably provided with a plunger holder on which plungers are arranged at an adjustingly variable spacing. The above components on the die bases are easily changeable, while the spacing between the plungers is readily adjustable to the spacing between the pots in the cavity block to be used upon a change. The apparatus is suited to the production of various kinds of semiconductor devices in small quantities.

5 Claims, 7 Drawing Sheets

APPARATUS OF MULTIPLUNGER TYPE FOR ENCLOSING SEMICONDUCTOR ELEMENTS WITH RESIN

BACKGROUND OF THE INVENTION

Apparatus of the multiplunger type are used for enclosing semiconductor elements with resin to produce semiconductor devices. Such apparatus are disclosed, for example, in U.S. Pat. Nos. 4,347,211, 4,388,265 and 4,511,317 and U.S. patent application Ser. No. 796,814. Among these apparatus, the apparatus of U.S. Pat. No. 4,388,265 has the following construction.

The apparatus has a stationary die, a movable die opposed to the stationary die, a plurality of pots formed in one of the dies, a plurality of cavities provided between the two dies, gates for holding each of the pots in communication with specified cavities around the pot, plungers arranged in corresponding relation with the pots in position and in number, a mechanism for reciprocatingly moving the plungers, etc.

Such conventional apparatus are primarily designed for the mass production of semiconductor devices having a high quality. Accordingly, the cavities in the cavity blocks are usually shaped identically. Further for the purpose of mass production, each cavity block is usually fixed to a die base. Thus, the apparatus is not so adapted that one of various cavity blocks is selectively removably mountable on the die base.

In recent years, however, a wide variety of semiconductor devices are often produced in small quantities. In such a case, it is critical that desired cavity blocks be readily interchangeable for use on the die base.

With the conventional apparatus of the type described, nevertheless, no consideration is given to easy and frequent changeability of cavity blocks for the die base. Whereas the plungers, plunger holder, and ejector plate must invariably be changed with the replacement of the cavity block, no consideration whatever is therefore given to easy changeability of these components.

Thus, the conventional semiconductor element enclosing apparatus is not so adapted that the cavity block and other members are easily changeable. Since these components are extremely difficult to change, the apparatus has the inherent problem of reduced production efficiency when it is used for producing various semiconductor devices in small quantities.

SUMMARY OF THE INVENTION

The present invention relates to improvements in apparatus of the multiplunger type for enclosing semiconductor elements with resin.

The main object of the present invention is to provide an apparatus for enclosing semiconductor elements with resin which is especially suited to the production of a wide variety of semiconductor devices in small quantities.

Another object of the present invention is to provide an apparatus of the type described comprising a cavity block, plungers, a plunger holder, an ejector plate, etc. which are easily and reliably mountable on and removable from a die base when these components are to be changed.

More specifically, the present invention provides an apparatus of the multiplunger type for enclosing semiconductor elements with resin which apparatus comprises a stationary die, a movable die opposed thereto and a plunger holder removably mounted on the base of the lower one of the dies.

To render the plunger holder, supporting plungers thereon, removably mountable as it is on the die base, the die base has a space required for removably mounting the plunger holder.

The plungers supported on the plunger holder are arranged at an adjustingly variable spacing in corresponding relation with the spacing of the pots formed in various cavity blocks, whereby the plungers are made usable for the different cavity blocks to be mounted on the die base.

To make the plungers substantially changeable as fixedly mounted on its holder attached to the die base, each of the plungers comprises a plurality of divided segments which are joined together end-to-end.

For the same purpose as to make the plunger holder removably mountable on the die base, the cavity block for the stationary die and the cavity block for the movable die are each made removably fittable into the die base concerned. Furthermore, an ejector plate supporting ejector pins thereon is made mountable on and removable from each cavity block, so that the ejector plate can be mounted or removed simultaneously when the cavity block is mounted on or removed from the die base.

With the apparatus thus constructed, the cavity block, as well as the assembly of the plungers and the holder therefor, is removably mountable on the die base. Since the cavity block and the ejector plate carrying the ejector pins are in the form of an assembly, the assembly is mountable on and removable from the die base. Further because the spacing between the plungers is adjustable to the spacing between the pots in various kinds of cavity blocks to be mounted on the die base, the plungers and the plunger holder need not be changed when the spacing is so adjusted. Since each plunger comprises lengths of divided segments, the forward end portion only of the plunger is changeable.

The apparatus of the present invention is therefore suited to the production of various semiconductor devices in small quantities.

Further according to the invention, the cavity block and other members are easily removable from and mountable on the die base. This achieves an improved overall operation efficiency.

DESCRIPTION OF THE PREFERRED EMBODIMENTS

Figure 1:
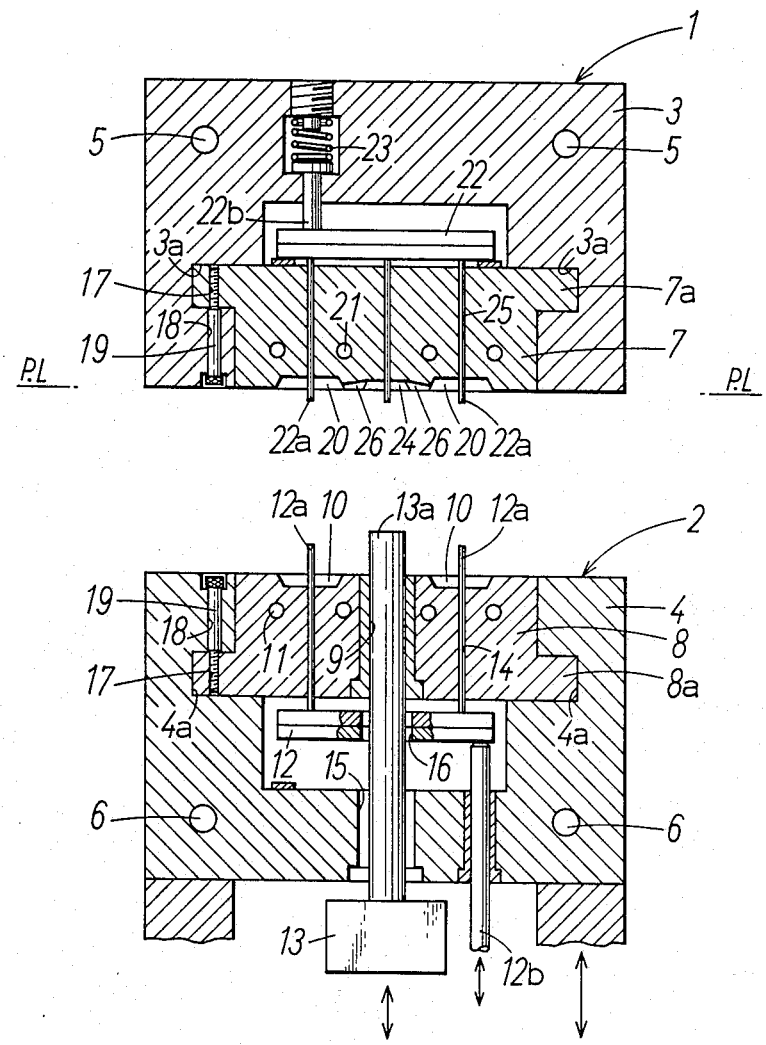
FIG. 1 is a front view partly in vertical section and showing the basic construction of an apparatus of the invention for enclosing semiconductor elements with resin.

FIG. 1 generally shows the overall construction of a semiconductor element enclosing apparatus embodying the present invention. The apparatus is of the multiplunger type and has the following construction.

The apparatus comprises a stationary die 1 and a movable die 2 disposed below and opposed to the die 1. These dies 1 and 2 include bases 3 and 4, respectively, which are provided with oil heaters, electric heaters or like heating means 5 and 6.

The stationary die base 3 and the movable die base 4 are respectively provided with a stationary cavity block 7 and a movable cavity block 8 removably fitted therein by a mortise joint.

The movable cavity block 8 has a plurality of pots 9 each of which is provided with a pair of right and left lower cavities 10 in the vicinity thereof. Means 11 for heating the lower cavity 10 is provided in the vicinity of the cavity 10. Disposed below the block 8 are a lower ejector plate 12 having ejector pins 12a for ejecting resin bodies molded in the lower cavities 10, and a plunger holder 13 supporting thereon plungers 13a for applying a pressure to the resin material supplied to the pots 9. The ejector pins 12l are fittingly inserted in bores 14 extending through the block 8 and communicating with the lower cavities 10. Each plunger 13a is inserted through bores 15, 16 formed in the movable die base 4 and the ejector plate 12, respectively, and fitted in the pot 9. The tenon la of the block 8 has at least one vertical screw hole 17. When the tenon 8a is fitted in the mortise 4a to install the block 8 in the base 4 as specified and as shown in FIG. 1, the screw hole 17 is in register with a vertical bolt hole 18 formed in the base 4. Accordingly, the block 8 can be properly fixed in position to the base 4 by screwing a positioning bolt 19 into the screw hole 17 through the bolt hole 18.

While an oil heater or electric heater is usable as the heating means 11, use of the electric heater involves a likelihood that the amount of heat generation will differ, for example, between an intermediate portion of the heater and the opposite ends thereof, consequently unevenly heating the cavities 10 of the block 8. To obviate such temperature variations during heating, it is desirable to use a thermopipe (super-thermoconductive element) for the heating means 11. The thermopipe (not shown) comprises, for example, a container main body in the form of a hollow pipe of stainless steel or the like and a heating medium, such as mercury, contained in the main body. The heating medium, when heated by a power supply, uniformly heats the entire container. This heating means is advantageous for heating the resin material since the container can be heated to about 180° to about 500° C. without resulting in a temperature gradient that would be produced by an electric heater.

As already stated, a usual oil heater or electric heater is usable as the heating means 5, 6 for the die bases 3, 4.

The arrangement including the stationary die base 3, the stationary cavity block 7 and heating means 21 therefor is substantially identical with the above arrangement including the movable die base 4, the movable cavity block 8 and the heating means 11 therefor.

More specifically, the stationary cavity block 7 has a pair of right and left upper cavities 20, 20 opposed to each pair of lower cavities 10, 10. The heating means 11 is provided in the vicinity of the upper cavities 20. Disposed above the block 7 are an upper ejector plate 22 having ejector pins 22a, a support pin 22b for the plate 22, and a spring 23 for depressing the plate 22 through the pin 22b. As seen in FIG. 1, the ejector pins 22a are fittingly inserted through vertical bores 25 formed in the block 7 and communicating with the upper cavities 20 or culls 24 opposed to the pots 9. The ejector plate 22 is depressed by the force of the spring 23 when the dies are opened as seen in FIG. 1, whereby the resin bodies molded in the upper cavities 20, the culls 24 and gates 26 through which the cavities 20 communicate with the culls 24 are forced out therefrom.

At this time, the lower ejector plate 12 is pushed up by an ejector bar 12b, whereby the molded resin bodies in the lower cavities 10 are ejected. However, when the movable die 2 is raised into clamping contact with the stationary die 1 at the plane of their parting line P.L., upper and lower return pins (not shown) opposed to and mounted on the upper and lower ejector plates 22, 12 retract the plates 22, 12 upward and downward, respectively.

The stationary cavity block 7 and the stationary die base 3 have a tenon 7a and a mortise 3a which are the same as the tenon 8a and the mortise 4a of the movable cavity block 8 and the movable die block 4. Further provided is fixing means comprising a screw hole 17, a bolt hole 18 and a bolt 19 and identical with the above-mentioned means for fixing the movable cavity block 8 to the movable die base 4.

The movable cavity block 8 is fittable into or removable from the base 4, for example, together with the lower ejector plate 12 when the plungers 13a are in downwardly moved position.

The stationary cavity block 7 is fittable into or removable from the base 3, for example, together with the upper ejector plate 22 after the support pin 22b is removed from the plate 22.

It will be understood from the foregoing description that the both the cavity blocks 7, 8 are properly and easily mountable on the die bases 3, 4 removably, by the simple means of fitting.

When the cavity blocks 7, 8 are to be changed, these blocks are usually changed along with the ejector plates 22, 12 to be mounted on the cavity blocks. Further the new cavity block to be mounted on the die die base can be different from the one already mounted in the position or arrangement of pots. Thus, when various kinds of semiconductor devices are molded in succession, it is likely that the spacing between the plungers 13a will be different for different kinds of devices. In such a case, therefore, there arises a need to adjustingly vary the spacing between the plungers in accordance with the spacing between the pots of the cavity block to be used. Further the assembly of the holder and the plungers thus adjusted must be installed in place.

Thus, to initiate the subsequent resin molding operation rapidly, the above-mentioned members must be easily changed or adjusted for the enclosing apparatus.

FIGS. 2 to 9 show arrangements fulfilling this requirement.

These arrangements will now be described with reference to the drawings. Since the enclosing apparatus including these arrangements is substantially the same as the one shown in FIG. 1, like parts are designated by like reference numerals throughout FIGS. 1 to 9.

Figure 2:
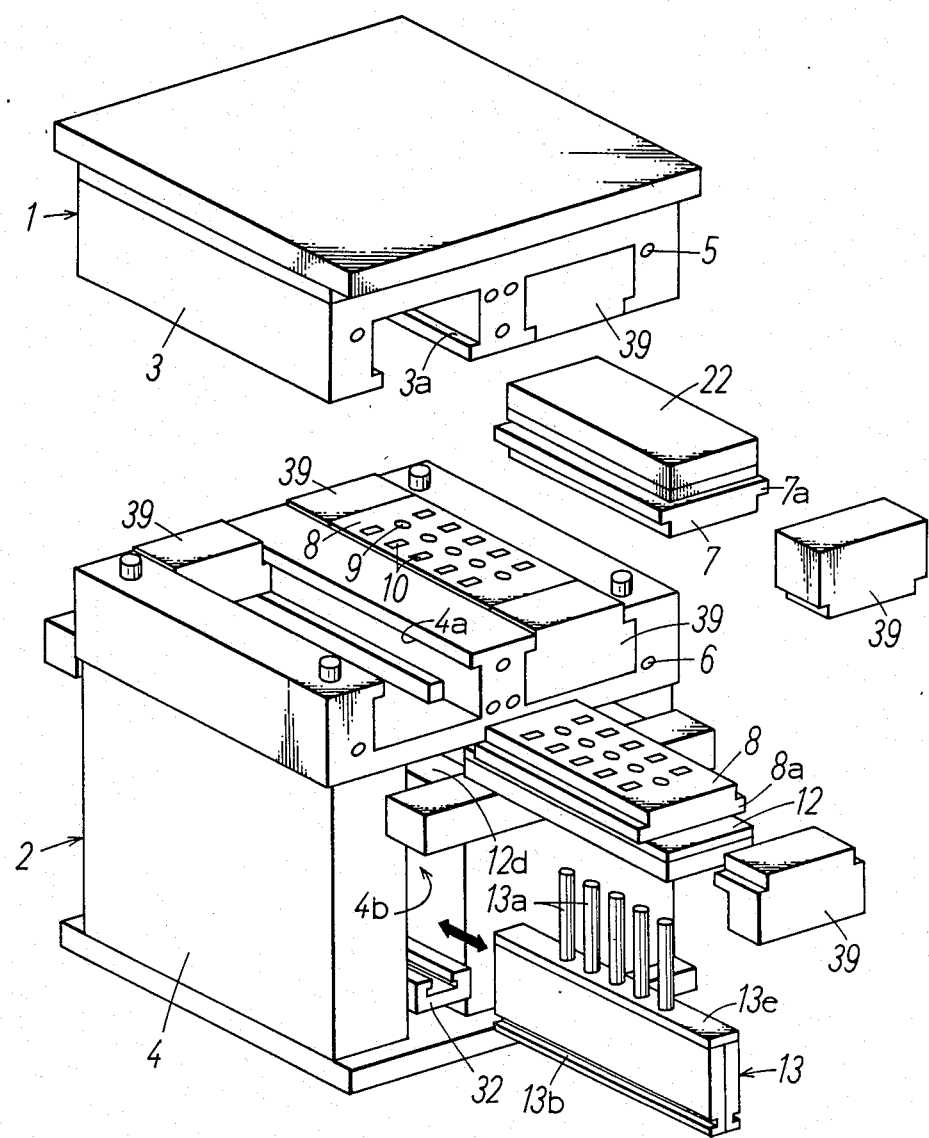
FIG. 2 is an overall perspective view of the apparatus showing a stationary dip and a movable die as partly exploded.
Figure 3:
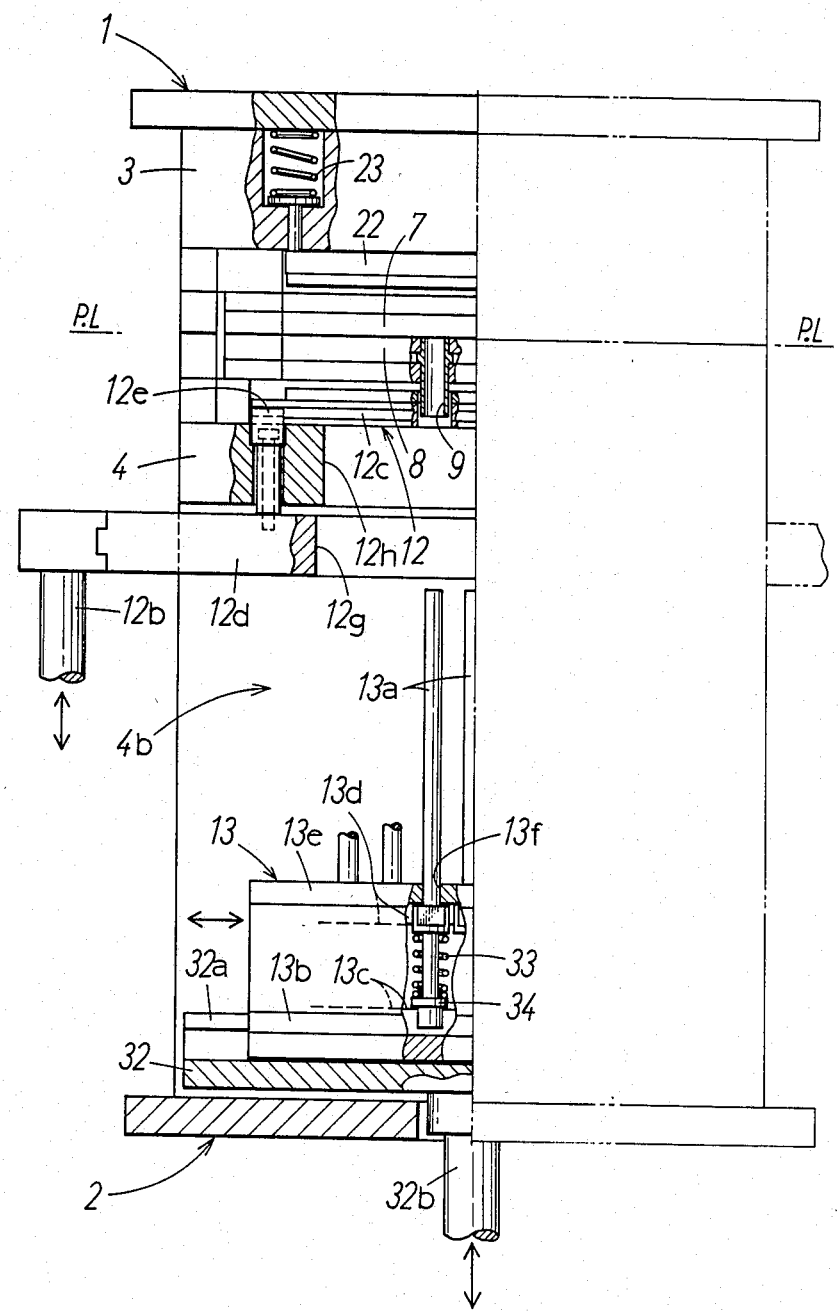
FIG. 3 is a side view partly in vertical section and showing the apparatus when the dies are clamped.
Figure 4:
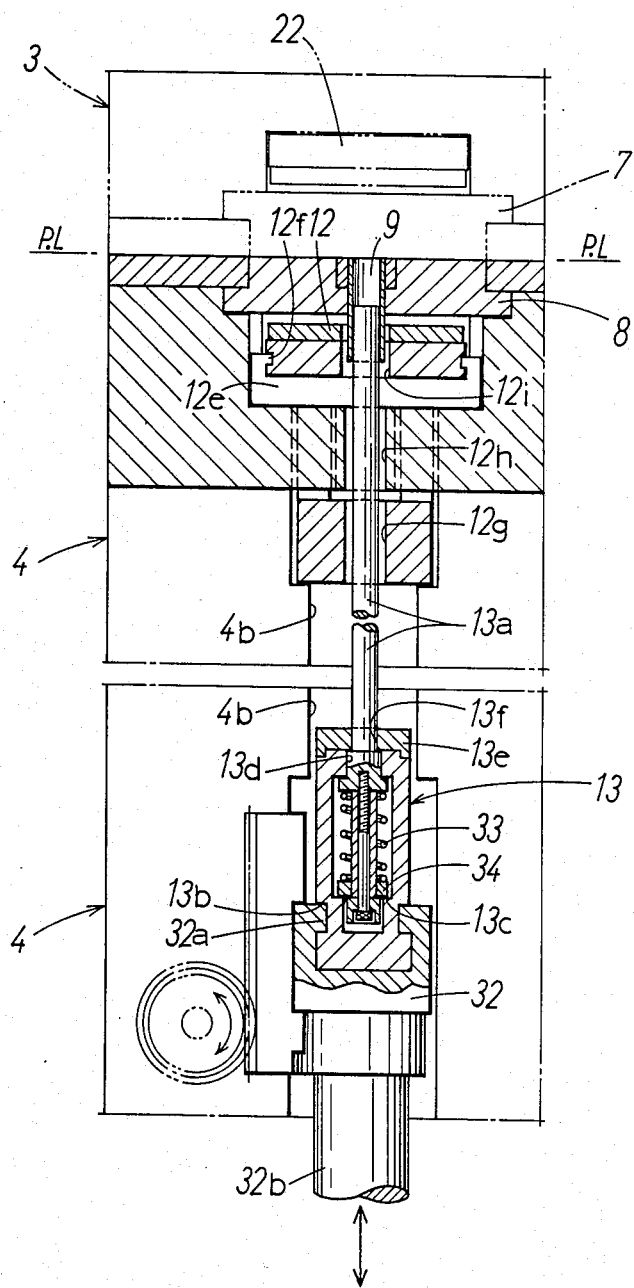
FIG. 4 is an enlarged front view partly in vertical section and corresponding to FIG. 3 to show the apparatus.
Figure 5:
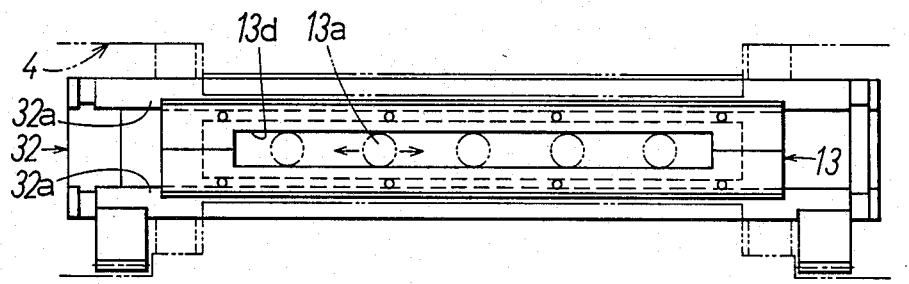
FIG. 5 is a plan view showing a plunger holder assembly.
Figure 6:
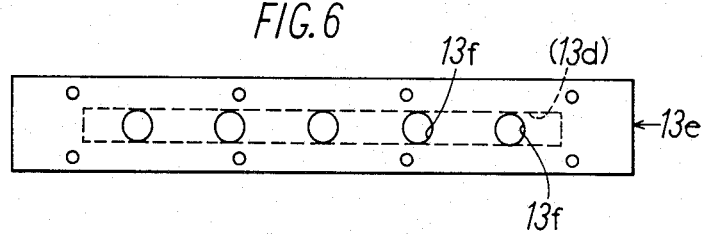
FIG. 6 is a plan view showing a cover plate for the plunger holder.
Figure 7:
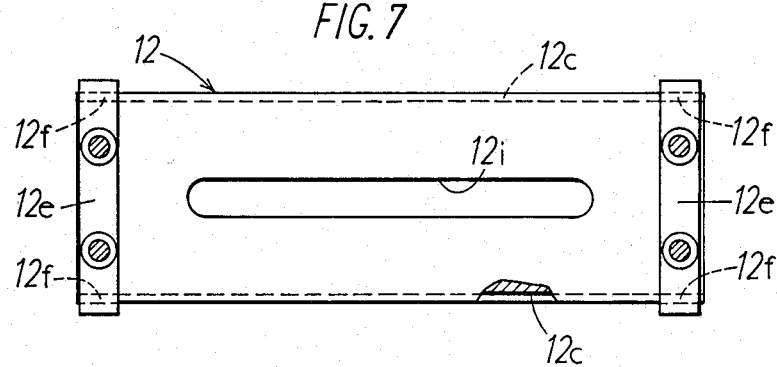
FIG. 7 is a bottom view partly broken away and showing a lower ejector plate assembly.

FIG. 2 is an exploded view showing a semiconductor enclosing apparatus comprising detachable main components. The plungers 13a included in this apparatus are so adapted that the spacing therebetween is adjustingly variable as seen in FIGS. 3 to 7. Further the plungers 13a and a holder 13 therefor are combined into an assembly which is mountable on and removable from the movable die base 4.

More specifically, a rail member 32 is disposed under the plunger holder 13 and extends in parallel with the row of plungers 13a. Oppose horizontal ridges 32a formed on the rail member 32 at opposite sides thereof are engaged in horizontal grooves 13b formed in opposite sides of the plunger holder 113. Accordingly, the assembly of the plungers 13a and the holder 13 is supported by the ridges 32a of the rail member 32. Further the assembly can be withdrawn from the movable die bas 4 by being guided by the ridges 32a. The plungers 13a are individually biased upward by resilient members 33, such as springs, housed in the holder 13 and equal in resiliency. Consequently, even if varying amounts of resin material are supplied to the pots 9, the portions of material can be subjected to a uniform pressure by the plungers 13a. The application of uniform pressure to the portions of material assures that the molten resin portions injected into the upper and lower cavities 20, 10 can be molded under the same condition.

The lower end of each plunger 13a has a seat 34 on which the resilient member 33 bears, and the seat 34 is slidably in contact with a horizontal slide face 13c at the bottom of the holder 13 inside thereof. The top wall of the holder 13 is formed with a slot 13d extending longitudinally thereof. Consequently, the plungers 13a are horizontally slidable on the slide face 13c forward or rearward within the range of the slot 13d of the holder 13. The upper side of the holder 13 is further covered with a cover plate 13e removably mounted thereon. A plurality of apertures 13f for regulating the spacing between the plungers 13a are formed in the cover plate 13e in corresponding relation with the position of the pots 9 formed in a row in the lower cavity block 8. Accordingly, the spacing between the plungers 13a can be adjusted as desired by the provision of the cover plate 13e wherein the apertures 13f are formed at the same spacing as the pots 9.

A rod 32b secured to the rail member 32 is reciprocatingly movable upward and downward by a drive mechanism (not shown) such as a hydraulic, pneumatic or electric motor. The rod 32b, when raised, causes the holder 13 to insert the plungers 13a into the corresponding pots 9 in the cavity block (see FIG. 4). The resin material is molded in this state.

The lower ejector plate 12 is disposed in a lower portion of the lower cavity block 8 and is formed in each of its opposite sides with a horizontal groove 12c. A support bar 12d for the plate 12 is fixedly provided thereon with an engaging member 12e for the plate 12, the engaging member 12e being disposed at each of the front and rear ends of the plate 12 (see FIG. 7). The engaging member 12e has on its opposite sides engaging projections 12f which are engaged in the opposite grooves 12c in the plate 12. Each plunger 13a extends through a longitudinal slot 12g formed in the support bar 12d, a longitudinal slot 12h formed in the movable die base 4 and a longitudinal slot 12i formed in the lower ejector plate 12 and is inserted into the pot 9. Accordingly, the lower ejector plate 12 is removable from the base 4 along with the lower cavity block 8 after withdrawing each plunger 13a downward from the pot 9 and the slot 12i in the lower ejector plate 12. When the plate 12 and the cavity block 8 are mounted i place, the plunger 13a is conversely fitted into place. When the plate 12 is to be thus removed or installed in place, the plate 12 is smoothly slidable by being guided by the engaging members 12e and the projections 12f thereon. Further when the ejector bar 12b is moved upward or downward, the ejector pins on the plate 12 are similarly moved with the bar 12b through the support bar 12d, the engaging members 12e and the plate 12.

Figure 8:
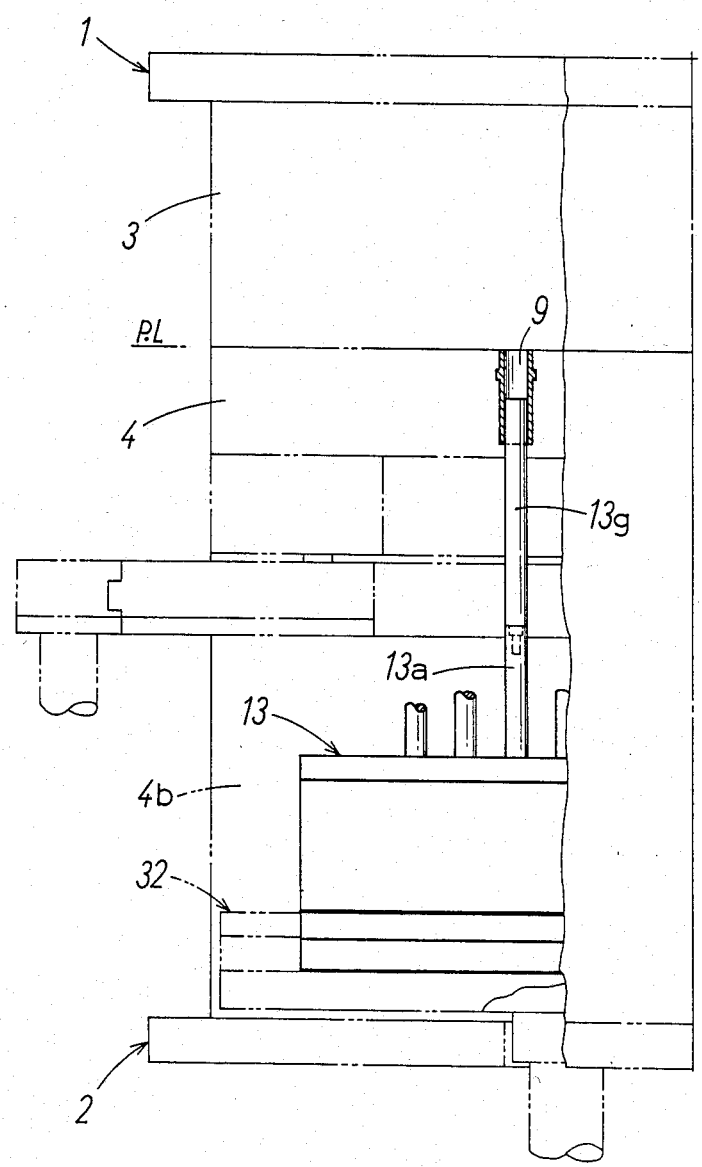
FIG. 8 is a side view partly broken away and showing another plunger holder assembly as mounted on a die base.

FIG. 8 shows an arrangement intended to make the movable die base 4 small-sized.

The movable die base 4 shown in FIG. 2 has the advantage that the plungers 13a and the holder 13 therefor are easy to change. However, since the plungers 13a extend vertically, the space 4b accommodating the plunger assembly has a large vertical dimension, consequently rendering the apparatus large-sized in its entirety. To overcome this problem, each plunger 13a shown in FIG. 8 comprises a plurality of divided segments arranged axially thereof and including a removable forward end portion 13g. When each end portion 13g is removed, the plunger holder 13 is removable from the die base 4. In addition to the advantage of compacting the die base 4, the forward end portion 13g only is changeable which portion is to be inserted into the pot 9, so that the clearance in the pot 9 around the forward end portion 13g can be held properly at all times. For example, when the clearance becomes enlarged owing to abrasion, failing to give the specified pressure to the resin material, the plunger end portion 13g only needs to be changed. This assures the advantage of eliminating the need to replace the whole plunger 13a after disassembling the plunger holder 13. Moreover, the plunger end 13g is easy to remove since the plunger end is removable at the plane of the parting line.

Figure 9:
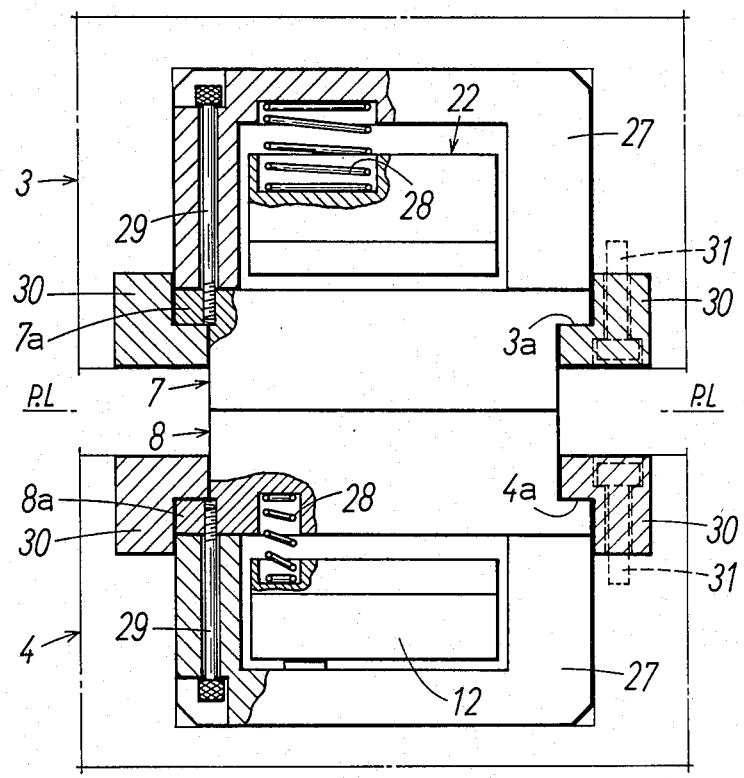
FIG. 9 is a front view partly broken away and showing assemblies each comprising a cavity block and an ejector plate.

FIG. 9 shows an arrangement wherein holders 27, 27 for supporting the ejector plates 22, 12 are secured to the cavity blocks 7, 8, respectively.

With this arrangement, the assembly of the ejector plate 22 (12) and the cavity block 7 (8) is mountable on or removable from the die base 3 (4) at one time. The drawing further shows springs 28, bolts 29 for fastening the holders 27 to the cavity blocks 7, 8, members 30 defining mortises 3a, 4a and bolts 31 for fastening the members 30.

FIG. 2 further shows blocks 39 for fixing the cavity blocks 7, 8 at their front and rear ends.

In the foregoing embodiments, the tenons 7a, 8a and the mortises 3a, 4a, grooves 13b and ridges 32a, etc. are provided on or in the opposed members concerned relative to each other, so that these portions may be modified or changed suitably in view of the die manufacturing procedure or of the mode in which the apparatus is actually used.

With the apparatus of the present invention, the stationary and movable die bases 3, 4, ejector plates 22, 12, and the plungers 13a and holder 13 therefor, i.e. important constituents of the enclosing apparatus, are easily mountable on and removable from the stationary and movable die bases 3, 4 within a shortened period of time. Further before the cavity blocks 7, 8 are installed on the die bases 3, 4, these blocks 7, 8 can be preheated to a predetermined temperature (e.g. at least resin molding temperature) by the heating means 21, 11 which are provided specifically therefor respectively, whereby the subsequent resin molding operation can be initiated promptly. With these features, the cavity blocks and other important components can be intentionally made changeable for use on the die bases. Accordingly, the present apparatus for enclosing semiconductor elements with resin is suited to the production of a wide variety of semiconductor devices in small quantities for which frequent change of these components is necessary.

Although important embodiments of the present invention have been described above, these embodiments are given for illustrative purposes only and are in no way limitative. Accordingly, various modifications and alterations are included within the scope of the invention insofar as they do not depart from the definitions of the appended claims.

What is claimed is:

1. An apparatus of the multiplunger type for enclosing semiconductor elements with resin, suitable for producing wide variety of semiconductor devices in small quantities by exchanging components of the apparatus suitable for producing semiconductor devices of one kind for similar components suitable for producing of semiconductor devices of a different kind, said apparatus comprising a stationary die base, a movable die base opposed to the stationary die base, a stationary cavity block and a movable cavity block provided on the stationary die base and the movable die base, respectively, and opposed to each other, a plurality of pots formed in the lower one of the two cavity blocks, a plunger holder having plungers individually inserted in the pots, a plurality of cavities formed in each of the opposed surfaces of the two cavity blocks at the plane of parting line therebetween, culls formed in the other cavity block at the plane of the parting line and opposed to the pots, gates formed in the other cavity block and providing communication between each of the culls specified cavities in the other cavity block, two ejector plates having ejector pins for ejecting molded resin bodies from the cavities in the two cavity blocks and the culls, and heating means for the cavity blocks, said lower die base being provided with the plunger holder, and the apparatus further comprising means for removably mounting components comprising the stationary cavity block and the corresponding ejector plate with the ejector pins thereof as assembled with the stationary die base, so as to permit removal thereof from the stationary die base such that one or more of the stationary cavity block and the ejector plate with the said ejector pins thereof, can be exchanged relative to the stationary die base for a corresponding component or components suitable for producing a semiconductor device of a different kind, and means for removably mounting components comprising the movable cavity block, the plunger holder with the plungers thereof and the corresponding ejector plate with the ejector pins thereof, as assembled with the movable die base, so as to permit removal thereof from the movable die base such that one or more of the movable cavity block, the plunger holder with the plungers thereof, and the corresponding ejector plate with the ejector pins thereof, as assembled with the movable die base, can be exchanged relative to the movable die base for a corresponding component or components suitable for producing a said semiconductor of a different kind.

2. An apparatus as defined in claim 1 wherein the lower die base has a space therein and wherein said plunger holder is removably mounted in said space in the lower die base.

3. An apparats as defined in claim 1 further comprising means for enabling the plungers to be arranged at an adjustably variable spacing.

4. An apparatus as defined in claim 1 wherein each of the plungers comprises a plurality of segments which are separably connected together in end-to-end relation.

5. An apparatus as defined in claim 1 wherein a holder is secured to each of the cavity blocks for supporting the corresponding ejector plate thereon.

* * * * *